United States Patent [19]

Ware et al.

[11] 4,379,015

[45] Apr. 5, 1983

[54] PRODUCTION OF WATERPROOF CORRUGATED PAPERBOARD

[75] Inventors: Franklyn O. Ware, Danville, Ill.; William S. McDonald, Statesville, N.C.

[73] Assignee: MPW Tech. Associates, Danville, Ill.

[21] Appl. No.: 177,666

[22] Filed: Aug. 13, 1980

[51] Int. Cl.³ .............................. C09J 3/02; C08L 1/00
[52] U.S. Cl. .................................. 156/205; 156/328; 106/212
[58] Field of Search .......................... 260/9 R, 17 ST; 106/210, 212, 213; 156/328, 205, 207, 206, 208; 427/208.2, 211; 428/342

[56] References Cited

U.S. PATENT DOCUMENTS 3,359,223  12/1967  Nakamura et al. .......... 260/17.4 ST
3,591,534   7/1971  Dunholter et al. ................. 260/9 R Primary Examiner—Edward C. Kimlin
Assistant Examiner—Louis Falasco
Attorney, Agent, or Firm—Millen & White

[57] ABSTRACT

The production of waterproof corrugated paperboard is improved by employing a Stein-Hall type adhesive containing 1.75–5 times the conventional amount of waterproofing resin, and applying the adhesive at about ½ to ¾ the usual rate within 30 minutes after the addition of the resin thereto.

7 Claims, No Drawings

PRODUCTION OF WATERPROOF CORRUGATED PAPERBOARD

BACKGROUND OF THE INVENTION

This invention relates to an improved method for the production of waterproof corrugated paperboard.

In the production of corrugated paperboard, the adhesive conventionally employed to bond the corrugated liner to the facing sheets is a Stein-Hall starch-based adhesive in which about five-sixths of the starch is in the form of an uncooked aqueous starch suspension which is brought to the desired viscosity and provided with the requisite tack by a cooked starch paste, which also acts as a carrier to maintain the uncooked starch in suspension. The cooked portion is prepared separately and then blended with the uncooked starch slurry, which conventionally also contains caustic soda, to reduce the gelation time and temperature of the uncooked starch, and borax, to increase the tack of the adhesive. See U.S. Pat. Nos. 3,151,996 and 2,833,662. The starch is ordinarily cooked in a conventional manner, i.e., batch-wise by heating an aqueous slurry so as to gradually bring the temperature of the slurry to gelation temperature. Several processes have also been developed for cooking the starch slurry substantially instantaneously. See U.S. Pat. Nos. 2,717,213; 3,133,836; 3,228,781; 3,308,037; and 3,450,549. U.S. Pat. No. 3,228,781 employs such an instantaneous starch cooking method in the production of a Stein-Hall corrugated board adhesive. See also U.S. Pat. No. 2,609,326.

Because of the economic advantages, considerable effort has been directed to the production of a commercially acceptable flour-based adhesive. See U.S. Pat. Nos. 2,051,025; 2,102,937; 2,212,557; 2,291,586; 2,466,172; 2,529,597; 2,881,086; 2,999,028; 3,163,549; 3,251,703; 3,775,144; and 3,775,145.

When a high performance adhesive is desired, a high amylose (about 80%) starch instead of pearl starch is employed in the cooked or carrier portion of the adhesive. In our prior application Ser. No. 119,904, filed Feb. 8, 1980, whose disclosure is incorporated herein by reference, we disclose a method for converting pearl starch into a modified starch which produces a carrier having the properties of a carrier produced from a high amylose starch.

Several problems are associated with the production of waterproof corrugated paperboard. One of these problems is the variations in waterproofness of the board which occur during a commercial run or from run to run. This is attributed in part to the poor storage life of the adhesive after the resin is added thereto. To overcome this defect, a few mini-batch systems have been installed based primarily on the philosophy that due to poor storage life the resin is added continuously, thereby providing freshly prepared adhesive at the machine. The few mini-batch systems being utilized at the present time are essentially the same even though different engineering techniques are being used to accomplish the same purpose. They are equipped with a variable speed proportioning pump in order to add resin to a specified adhesive flow. The combined resin and adhesive are pushed through a static blender and empty into a 40–100 gallon tank which feeds the corrugating machine. The feed tank is maintained between predetermined high and low liquid levels with a load cell, probes or pressure sensitive high and low cells, such as a DP cell. The flow can be controlled with automatic valves or by actuating and stopping the pumping system. Whatever engineering technique is used, the principle of the proportioning pump adding the proper amount of resin to a controlled flow of basic adhesive and then mixing through a static blender in preparing a small operating quantity of waterproof adhesive is basic to all of them.

Such mini-batch systems, while solving the problems associated with the short storage life of waterproofing adhesives, do not solve other problems associated with the production of waterproof board.

There is a considerable tonnage of waterproof corrugated board manufactured which is used for shipping produce, wet iced poultry, meat boxes, and a variety of other end uses where the board is exposed to water or high humidity. Conventionally, waterproof corrugated adhesive is prepared in the Henry Pratt system. Although there are a variety of techniques used, they all are related to a higher rate of carrier application and higher solids content. In order to waterproof the corrugated paperboard, a conventional waterproofing resin is added to the Stein-Hall adhesive. A wide variety of such resins, e.g., recorcinol formaldehyde resins, urea formaldehyde resins and ketone aldehyde resins, e.g., acetone formaldehyde resins, can be employed. An improved cross-linking resin is the subject of U.S. Pat. No. 3,994,424, whose disclosure is incorporated herein by reference.

The degree of waterproofing is directly related to the rate of adhesive application. We have found that the increase in waterproofing is a linear function relative to rate of adhesive application up to 8 lbs of dry adhesive pickup per 1,000 sq. ft. of board and levels off thereafter so that little improvement in waterproofness occurs above 8 lbs/1,000 sq. ft. of board. The resin is added when the adhesive is finished, mixed for 15 min. and then pumped to storage. Here it is used and, when switching from waterproof to domestic board, the adhesive in storage continues to increase in viscosity. The general practice is to add water to reduce the viscosity, which adversely effects both the machine operation and board quality.

In order to achieve an acceptably high rate of resin application, higher amounts of adhesive than is used for conventional corrugated board is applied when making waterproof board because concentrations of resin high enough to permit the use of the same amount of adhesive magnify the storage instability problems.

Several other problems are associated with conventional methods for producing waterproof board. One of these problems is that the resin has not completely cured when it comes off the corrugator. Therefore, it has been standard practice within the industry to allow the finished board off the machine to remain stacked for 12 hours in order to achieve resin cure. In the industry, this is referred to as "curing in the hot stack." This necessarily adversely affects the economics of production.

Another problem is the strength of the waterproof board. An examination of conventionally produced waterproof board shows that because of the high amount of water added at the double backer station going directly into the double backer over, where pressure is exerted against the board in order to achieve heat transfer, all of the flutes are crushed at the double backer facing. This reduces top-to-bottom compression and reduces stacking strength, which therefore demands much heavier weight board in order to meet specifications.

Another problem associated with the application of larger amounts of water to the paper, either through the use of larger amounts of adhesive or the addition of water to the finished adhesive to maintain proper viscosity or other properties, is that the production rate of waterproof board usually is substantially slower than conventional board.

The aforesaid problems are avoided by the production of corrugated paperboard according to the process of this invention.

SUMMARY OF THE INVENTION

According to this invention, there is provided a process for the production of waterproof corrugated board employing a Stein-Hall type composite adhesive containing a waterproofing resin which comprises employing an adhesive containing about 1.75 to five times the conventional 120–130 lbs. of resin per 1,000 gallons of adhesive and applying the adhesive within 30 minutes and preferably within about 15 minutes after the addition of the resin thereto at about one-half to three-quarters the conventional rate of about 8 lbs/1,000 sq. ft. of board.

DETAILED DISCUSSION

All of the ingredients and proportions of known Stein-Hall type adhesives are used in the adhesives employed in the process of this invention, except as noted hereinbelow.

Whereas about 120–130 lbs. of waterproofing resin per 1,000 gallons of finished adhesive is conventionally employed to produce waterproof board, in the process of this invention about 1.75 to 5 times that amount is employed, viz., about 225 to 600 lbs/1,000 gal. (about 157–420 lbs. per 700 gallon batch).

Because an adhesive containing this much waterproofing resin has extremely poor stability, it is applied within about 30 minutes and preferably within 15 minutes after the resin is added thereto, most preferably between about 5 and 15 minutes, as the waterproofing capability of the adhesive rises sharply until it reaches a maximum at between 10 and 15 minutes after addition of the resin thereto and then drops at a rate about one-third as fast until by one hour, 50% of its waterproofing capability has been lost. As will be apparent, the resin can, with appropriate modification of the applicator equipment, be added to, i.e., mixed with, the adhesive at any time before the latter is absorbed on the paper stock, e.g., simultaneously with or immediately prior to the application of the adhesive thereto.

The advantages of the instant process are not the result of increasing substantially the amount of resin applied to board. Quite the contrary, because the rate of adhesive application is reduced to about one-half to three-quarters and preferably about half the 7–10 lbs. (solids)/1,000 sq. ft. of board conventionally applied, i.e., about 3.5 to 5 lbs/1,000 sq. ft. and most preferably about 4 lbs/1,000 sq. ft. of board, the amount of resin applied to the board is in the same range as that applied with conventional adhesives. For example, applying from 7–10 lbs/1,000 sq. ft. of a conventional adhesive containing 90 lbs. of resin, 400 lbs. of cooked high amylose and starch and 1,400 lbs. of uncooked pearl starch, 32 lbs. caustic and 21 lbs. of borax per 700 gallon batch in the conventional manner applies 0.32–0.46 lbs. resin/1,000 sq. ft. In the process of this invention, applying about 3.5–5 lbs/1,000 sq. ft. of the same adhesive containing 200 lbs. of resin per 700 gallon batch will apply 0.34–0.49 lbs. of resin per 1,000 sq. ft.

The reduction in rate of adhesive application has a dramatic effect upon the properties of the finished board and rate of production.

In the process of this invention, the board as it comes right off the machine has waterproof properties comparable to conventionally produced board after curing in the hot stack. An examination of the flutes of board produced by the process of this invention showed no crushing, thus giving a substantial increase in top-to-bottom compression. This relates to an increase in stacking strength. On the machine, because of the lower rate of adhesive pick-up, which means much less water going into the double backer, production speed can be increased substantially. This all relates to faster production, lower cost and improved board quality.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever.

EXAMPLE 1

In the primary mixer add 100 gals. water and 400 lbs. vinamyl high amylose starch. Bring to 140° F., add 32 lbs. of caustic dissolved in 10 gals. water. In the secondary mixer, add 350 gals. water, 21 lbs. 5 mol borax and 1,400 lbs. pearl starch. Add 70 gals. cooling water to primary mixer, mix 4 min. Drop primary to secondary. Let mix 15 min. and pump to storage. Draw from storage into a mini-batch system stationed in the starch kitchen in order to develop a 10 min. time factor to pump to the corrugator machine in order to reach optimum waterproofing. Add "Amrez" (Pacific Resins) acetone formaldehyde waterproofing resin to the adhesive at the mini-batch system at the rate of 200 lbs. to a 700 gal. batch. Apply the adhesive within 15 minutes after the resin is added thereto at the rate of 5 lbs/1,000 sq. ft. The resulting corrugated board emerges from the corrugator with the resin fully cured. Top-to-bottom compression values and other properties are substantially higher than otherwise identical conventionally produced waterproof board.

EXAMPLE 2

Follow the procedure of Example 1 exactly, except prepare the carrier portion of the adhesive by adding to the primary mixer 139 gals. water, 400 lbs. pearl starch and 1 qt. 35% hydrogen peroxide. To 32 lbs. of caustic, dissolved in 10 gals. water, add 1 pint of water with 15 grams ferrous sulfate, freshly dissolved. Bring primary to 140° F., drop caustic and mix 15 min. Corrugated board for meat boxes could be produced with an adhesive application rate of 5 lbs/1,000 sq. ft. 60% faster than usual. There was no crushing of the flute tips and super waterproofness specification was met right off the machine.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for the production of waterproof corrugated board wherein a waterproofing resin is added to a conventional Stein-Hall high performance starch based composite adhesive containing cooked and uncooked starch employed to produce the corrugated board from a paper stock so as to render the corrugated board waterproof, the improvement which comprises employing an amount of resin, from about 225–600 lbs. of the resin per 1,000 gallons of adhesive, which imparts extremely poor stability to the adhesive; adding the resin the adhesive simultaneously with or immediately prior to the application of the adhesive to the paper stock; and applying the resin-containing adhesive to the paper stock at the rate of about 3.5–5 lbs/1,000 sq. ft. of board.

2. A process according to claim 1 wherein the adhesive is applied at a rate of about 4-5 lbs/1,000 sq. ft.

3. A process according to claim 1 wherein the adhesive contains about 0.275 to 0.3 lbs/gallon of resin.

4. A process according to claim 1 wherein the resin is an acetone formaldehyde resin.

5. A process according to claim 1 wherein the adhesive is applied within 15 minutes after addition of the resin thereto.

6. A process according to claim 1 wherein the adhesive contains about 0.275 to 0.3 lbs/gallon of resin and is applied within 15 minutes after addition of the resin thereto, at a rate of about 4-5 lbs/1,000 sq. ft.

7. A process according to claim 6 wherein the resin is an acetone formaldehyde resin.

* * * * *

UNITED STATES PATENT AND TRADEMARK OFFICE
CERTIFICATE OF CORRECTION

PATENT NO. : 4,379,015

DATED : April 5, 1983

INVENTOR(S) : FRANKLYN O. WARE ET AL

It is certified that error appears in the above-identified patent and that said Letters Patent is hereby corrected as shown below:

Column 5, line 16: reads "resin the adhesive simultaneously with or immediately"

Should read -- resin to the adhesive simultaneously with or immediately --

Signed and Sealed this

Thirty-first Day of May 1983

[SEAL]

Attest:

DONALD J. QUIGG

Attesting Officer

Acting Commissioner of Patents and Trademarks